United States Patent Office

3,444,144
Patented May 13, 1969

3,444,144
POLYPHENYLENE RESINS CONTAINING CARBOXYLIC GROUPS
Alan J. Neale, Llangollen, Wales, and Ryland J. Roberts, Acrefair, Wrexham, England, assignors to Monsanto Chemicals Limited, London, England, a British company
No Drawing. Filed Aug. 7, 1967, Ser. No. 658,650
Claims priority, application Great Britain, Aug. 17, 1966, 36,742/66
Int. Cl. C08g *17/04, 17/06, 17/08*
U.S. Cl. 260—78.4      12 Claims

ABSTRACT OF THE DISCLOSURE

Disclosed herein are novel polyphenylene resins which contain carboxylic groups, derived from the presence of an anhydride in the condensation polymerization reaction. These materials are of value in the production of heat-stable cross-linked high temperature resistant composite structures.

BACKGROUND OF THE INVENTION

Field of the invention

This invention relates to polymeric materials, more particularly to novel polyphenylene resins which contain carboxylic groups. These are prepared by reacting together a sulphonyl halide compound, an anhydride and a third aromatic compound having replaceable hydrogen atoms.

Description of the prior art

British patents specification Nos. 1,037,111 and 1,049,715 disclose processes for the production of aromatic polymers by heating aromatic sulphonyl halides containing two or more sulphonyl halide groups with aromatic compounds containing replaceable nuclear hydrogen atoms. However, the aromatic polymers described in these patents do not contain any reactive functional groups which will allow the polymers to undergo further reaction such as cross-linking either through inter or intra chain linkages or with other polymers or cross-linking agents to provide three dimensional, cross-linked polymer networks.

SUMMARY OF THE INVENTION

It has now been discovered that when an aromatic sulphonyl halide containing two or more sulphonyl halide groups is heated with a mixture of aromatic compounds including an aromatic carboxylic anhydride, aromatic polymers containing anhydride groups are obtained. Such polymers are able to undergo further reaction, for example cross-linking, by virtue of the reactivity of the anhydride groupings.

It is an object of this invention to provide novel aromatic polymers which contain carboxylic groups.

It is a further object of this invention to provide novel cross-linked aromatic polymers.

It is a further object of this invention to provide a process for producing novel aromatic polymers which contain carboxylic groups.

It is a further object of this invention to provide a process for producing novel cross-linked aromatic polymers.

DESCRIPTION OF THE PREFERRED EMBODIMENTS

The foregoing and other objects are provided by the new materials of the present invention which are carboxylic containing aromatic polyanhydrides that can be produced by a process which comprises heating an aromatic polysulphonyl halide (that is to say an aromatic sulphonyl halide containing at least two sulphonyl halide groups each linked to a nuclear carbon atom), an aromatic intramolecular carboxylic anhydride having replaceable nuclear hydrogen atoms, and a third aromatic compound having replaceable nuclear hydrogen atoms, under conditions such that sulphur dioxide and a hydrogen halide are evolved, the anhydride being one which, except by virtue of having replaceable nuclear hydrogen atoms, is inert with respect to the sulphonyl halide, and the third aromatic compound being one which, except by virtue of having replaceable nuclear hydrogen atoms is inert with respect to the sulphonyl halide and is inert with respect to the anhydride.

A typical polyanhydride is one obtainable form benzene-m-disulphonyl chloride, phthalic anhydride and terphenyl. Polyanhydrides having a range of properties and various proportions of anhydride units can be produced, depending for example on the ratio of the reactants employed in the process. These ratios are usually chosen, and the process is carried out under such conditions, that the product is fusible and is soluble in such solvents as chloroform.

The aromatic sulphonyl halide used in the production of a polyanhydride can be a compound containing one or more aromatic nuclei, and where it contains more than one nucleus, the sulphonyl halide groups can be linked to carbon atoms of the same nucleus or to carbon atoms of different nuclei. A preferred class of polynuclear aromatic sulphonyl halides are those that contain from two to four aromatic nuclei arranged in a sequence, successive nuclei in the sequence being linked directly or through an intermediate atom or group, for example an oxygen or sulphur atom, or a carbonyl, sulphonyl, phosphonyl or silicon group.

The nucleus or nuclei in the sulphonyl halide can be carbocyclic or heterocyclic, but carbocyclic nuclei, such as for instance benzene or naphthalene nuclei, are usually preferred. Useful properties are, however, also associated with nuclei having a heterocyclic ring fused to one or more carbocyclic rings, for example dibenzothiophen or dibenzofuran nuclei. Thus the sulphonyl halide can, for example, be a sulphonyl halide derivative of benzene; naphthalene; a polyaryl, especially a polyphenyl such as for instance biphenyl or terphenyl; an aryl ether, especially a phenyl ether, for example diphenyl ether or a bis-(phenoxy)benzene; an aryl sulphide or sulphone, for example diphenyl sulphide, a dinaphthyl sulphide or diphenyl sulphone; dibenzothiophen; or of dibenzofuran.

The nucleus or nuclei of the aromatic sulphonyl halide can contain one or more substituents in addition to the sulphonyl halide groups. Such a substituent can be selected from a range of atoms or groups, including for instance halogen atoms, alkyl groups and alkoxy groups. In this respect, however, preferred polyanhydrides are those derived from unsubstituted aromatic sulphonyl halides or from aromatic sulphonyl halides having one or more fluorine or chlorine atoms as additional nuclear substituents.

The sulphonyl halides usually employed in practice are the sulphonyl chlorides although the sulphonyl bromides for example can also be used.

Specific examples of suitable aromatic sulphonyl halides are: benzene-1,3-disulphonyl chloride; benzene-1,3-disulphonyl bromide; 2,4,5,6-tetrachlorobenzene - 1,3 - disulphonyl chloride; naphthalene-1,5-disulphonyl chloride; naphthalene-2,7-disulphonyl chloride; naphthalene-1,3,6-trisulphonyl chloride; diphenyl-4,4'-disulphonyl chloride; diphenyl ether-4,4'-disulphonyl chloride; diphenyl sulphide-4,4'-disulphonyl chloride, dibenzothiophen-2,8-disulphonyl chloride and dibenzofuran-3,7-disulphonyl chloride.

The aromatic carboxylic intramolecular anhydride that is used in the production of a polyanhydride can contain one or more anhydride groupings, one or more aromatic nuclei, and, consistent with the requirement that nuclear hydrogen atoms should be present one or more additional, inert, nuclear substituents, for example, halogen atoms, in particular fluorine or chlorine atoms. Preferred anhydrides are those that are unsubstituted or that contain not more than two halogen atoms per aromatic nucleus.

The nucleus or each nucleus of the aromatic anhydride is generally carbocyclic, for instance a benzene or naphthalene nucleus, although desirable properties are also associated with nuclei having a heterocyclic ring fused to one or more carbocyclic rings, for example dibenzothiophen or dibenzofuran nuclei. Where more than one aromatic nucleus is present, these can be linked to each other directly or indirectly, for example through an oxygen or sulphur atom, or through an alkylene, carbonyl sulphonyl, phosphonyl or silicon group.

Aromatic anhydrides containing more than one anhydride grouping are preferably compounds that also contain more than one aromatic nucleus, such that only one anhydride grouping is associated with any one nucleus.

Examples of anhydrides suitable for use in the present invention include:

phthalic anhydrides, the monochlorophthalic anhydrides; the phenylphthalic anhydrides, naphthalic anhydride;
3,3′,3,3′-biphenyl tetracarboxylic dianhydride;
diphenyl sulphone 3,3′,4,4′-tetracarboxylic dianhydride;
pyromellitic dianhydride;
2,3,6,7-napthalene tetracarboxylic dianhydride;
3,3′,4,4′-diphenyl tetracarboxylic dianhydride;
1,2,5,6-naphthalene tetracarboxylic dianhydride;
2,2′,3,3′-diphenyl tetracarboxylic dianhydride;
2,2-bis(3,4-dicarboxyphenyl) propane dianhydride;
bis(3,4-dicarboxyphenyl)sulfone dianhydride;
3,4,9,10-perylene tetracarboxylic dianhydride;
bis(3,4-dicarboxyphenyl)ether dianhydride;
naphthalene-1,2,4,5-tetracarboxylic dianhydride;
naphthalene-1,4,5,8-tetracarboxylic dianhydride;
2,6-dichloronaphthalene-1,4,5,8-tetracarboxylic dianhydride;
2,7-dichloronaphthalene-1,4,5,8-tetracarboxylic dianhydride;
2,3,6,7-tetrachloronaphthalene-1,4,5,8-tetracarboxylic dianhydride;
phenanthrene-1,8,9,10-tetracarboxylic dianhydride;
2,2-bis(2,3-dicarboxylphenyl)propane dianhydride;
1,1-bis(2,3-dicarboxyphenyl)ethane dianhydride;
1,1-bis(3,4-dicarboxyphenyl)ethane dianhydride;
bis(2,3-dicarboxyphenyl)methane dianhydride;
bis(3,4-dicarboxyphenyl)methane dianhydride;
bis(3,4-dicarboxyphenyl)sulfone dianhydride;
benzene-1,2,3,4-tetracarboxylic dianhydride;
3,4,3′,4′-benzophenone tetracarboxylic dianhydride;
2,3,2′,3′-benzophenone tetracarboxylic dianhydride;
2,3,3′,4′-benzophenone tetracarboxylic dianhydride, etc.

Especially preferred is phthalic anhydride.

The third aromatic compound used in the production of a polyanhydride can be one having one or more aromatic nuclei. The nucleus or nuclei can be carbocyclic or heterocyclic, but carbocyclic nuclei such as for instance benzene and naphthalene nuclei and nuclei having a heterocyclic ring fused to one or more carbocyclic rings as for example in dibenzothiophen and dibenzofuran nuclei, are usually preferred.

A particularly suitable group of aromatic compounds are those containing a sequence of two or more aromatic nuclei, successive nuclei being linked to each other directly or through an oxygen atom, a sulphur atom, a methylene or other linking group, for example a carbonyl, sulphonyl, phosphonyl or silicon group. The nuclei in these compounds are preferably carbocyclic nuclei, for example benzene or naphthalene nuclei, or nuclei containing a thiophen or furan ring fused to one or more carbocyclic aromatic rings, for example dibenzothiophen or dibenzofuran nuclei. The compounds thus include for example polyaryls, for instance polyphenyls, aryl ethers and polyaryl ethers, aryl sulphides and polyaryl sulphides, aryl sulphones arylmethylated (for example benzylated) polyaryls, dibenzofuranyl aryl ethers, dibenzothienyl polyaryls, and polyaryl dibenzothiophens.

Examples of aromatic compounds that can be used are: biphenyl; terphenyl; binaphthyl; quinquephenyl; sexiphenyl; septaphenyl; diphenoxy - terphenyl; diphenoxyquaterphenyl; bis-phenoxy-biphenylyl ether; bis-phenylthio-biphenylyl ether, diphenyl sulphone, bis(dibenzothienyl) benzene; and bis-dibenzofuranyl-diphenyl ether.

A further group of aromatic compounds that are suitable for use as the third component in the production of a polyanhydride are silicon-containing aromatic compounds. Preferred compounds contain more than one aromatic nucleus and are such that each aromatic nucleus is bonded to a silicon atom or to another aromatic nucleus either directly or through an oxygen atom, and each silicon atom is bonded either directly to an aromatic nucleus or through an oxygen atom to an aromatic nucleus or to another silicon atom.

Compounds having such an arrangement of aromatic nuclei and silicon atoms may be of various degrees of molecular complexity, and include such materials as for example tetraphenyl silane, tetraphenyl orthosilicate, diphenyl diphenoxy silane; phenyl tri(3-phenoxyphenoxy), the isomeric di(triphenylsiloxy)benzenes; the aromatic silicones, for example the cyclic aromatic siloxanes, such as for instance hexaphenylcyclotrisioxiane and octaphenylcyclotetrasiloxane, and the corresponding linear oligomers, and polysilicate polyesters that can be obtained by the condensation of a diaromatic dihalosilane, for example diphenyldichlorosilane, with a dihydric phenol. In general, the silicon containing aromatic compounds that are suitable for the production of the polyanhydrides of the present invention are substantially the same as those useful for the production of silicon-containing aromatic polymers according to British patent specification No. 1,049,715, in which specification such compounds are more fully described.

Subject to the requirements that the third aromatic compound should contain replaceable nuclear hydrogen atoms, and should be inert with respect to the anhydride, and, except by virtue of having replaceable nuclear hydrogen atoms, with respect to the aromatic sulphonyl halide, the third compound may contain one or more additional nuclear substituents. Such substituents include halogen atoms, for example fluorine, chlorine or bromine atoms. Preferred aromatic compounds are those that are unsubstituted or that contain not more than two halogen atoms per aromatic nucleus.

Several procedures are available for operating the process for the production of the aromatic polyanhydrides. In a preferred method, the sulphonyl halide is added gradually or in stages to a mixture of the anhydride and the third aromatic compound at the reaction temperature, but alternatively the total quantities of reactants to be used can be mixed initially, or a mixture of the sulphonyl chloride and a portion of the aromatic compound can be added gradually to a mixture of the remainder of the aromatic compound and the anhydride. The isolation of one or more polymers containing carboxylic groups is generally straightforward, especially when the sulphonyl chloride is added in stages, should such isolation be desired.

A temperature of not less than about 175° C. is generally required for a practical reaction rate in the process, and preferred temperatures are generally higher than this, for example in the range 190° C. to 375° C., especially in the range 200° C. to 300° C. Heating is normally continued until the evolution of sulphur dioxide and hydrogen halide is substantially complete.

A catalyst is not essential, but one can be used if desired, for example one of the catalysts for the arylation process described in British patent specification No. 959,605. Copper and copper compounds, for example copper halides, are among the most effective catalysts. A catalyst is preferably used in an amount of from about 0.001 to about 0.1 mol per mol of the aromatic sulphonyl halide.

As indicated above, polyanhydrides having a range of anhydride contents can be obtained by varying the proportions of the reactants. In general, the rate of reaction of the sulphonyl halide with the aromatic anhydride is less than its rate of reaction with the third aromatic compound, so that an excess of the anhydride relative to the amount which it is desired to incorporate in the resin is usually employed. The ratio of anhydride to sulphonyl halide can for example usefully be within the range 0.5 to 2.5 mols per equivalent of the sulphonyl halide (equivalent weight=molecular weight divided by the number of sulphonyl halide groups). The proportion of the third aromatic compound to the polysulphonyl halide is in general such that the molar ratio is not more than the number of sulphonyl halide groups in the sulphonyl halide, and preferably at least one mol of the aromatic polysulphonyl halide is present for each mol of the third aromatic compound. There can, for instance, be from 0.4 to 0.9 mol of the third aromatic compound per mol of the aromatic polysulphonyl halide. Any of the anhydride or third aromatic compound that has not reacted when evolution of sulphur dioxide and hydrogen halide is substantially complete can be recovered, for example by distillation of the reaction mixture under reduced pressure.

The ratios of reactants and the duration of heating can be selected to give polyanhydrides which are infusible solids, insoluble in such solvents as chloroform, trichloroethylene, chlorobenzene and xylene, and in which an appreciable degree of cross-linking by radicals derived from the aromatic polysulphonyl halide occurs. Where, however, it is desired to utilize the reactivity of the anhydride groupings it is preferable that the polyanhydride should be one that is fusible and soluble. Polyanhydrides of this latter type are usually obtained using the preferred proportions of reactants referred to above, even when the reaction is taken substantially to completion as indicated by evolution of 80% or more of the theoretical quantities of sulphur dioxide an hydrogen halide.

The invention is illustrated by the following examples which are set forth as being illustrative of the present invention and should not be construed as limitations thereof.

EXAMPLE 1

A mixture of 34.5 grams (0.15 mol.) of isomeric terphenyls and 74.0 grams (0.5 mol.) of phthalic anhydride is heated to its boiling point in a reaction vessel equipped with a stirrer, reflux condenser and a gas inlet tube. 54.5 grams (0.198 mol.) of m-benzene disulphonyl chloride is added from a heated dropping funnel over a period of 6½ hours while a slow stream of nitrogen is passed into the reactor.

Sulphur dioxide and hydrogen chloride are evolved and are entrained in the stream of nitrogen, which is led from the top of the reflux condenser into absorbers containing a measured quantity of sodium hydroxide solution. Analysis of the solution in the absorbers when the addition is complete shows that 97% of the theoretical quantity of hydrogen chloride and 88% of the theoretical quantity of sulphur dioxide is evolved.

The reaction mixture is distilled at a pressure of 25 mm. of mercury to recover 54 grams of unreacted phthalic anhydride. The residual resin, which weighs 67.5 grams, is therefore calculated to contain 29.6% by weight of phthalic anhydride units. It is completely soluble in chloroform.

EXAMPLE 2

75 grams (0.272 mol.) of benzene-m-disulphonyl chloride are added over a period of 6¾ hours to a refluxing mixture of 38.3 grams (0.166 mol.) of isomeric terphenyls, 100 grams (0.677 mol.) of phthalic anhydride and 0.0343 gram of copper, using the apparatus described in Example 1. 97.7% of the theoretical amount of hydrogen chloride and 95.3% of the theoretical amount of sulphur dioxide are evolved during this time.

The reaction mixture is distilled at a pressure of 25 mm. to recover 71 grams of unreacted phthalic anhydride, from which it is calculated that the residual resin (88 grams) contained 33% by weight of phthalic anhydride units.

EXAMPLE 3

In a number of preparations similar to those described in Examples 1 and 2, benzene-m-disulphonyl chloride is added over a period of 5½ to 6 hours to a refluxing mixture of phthalic anhydride and isomeric terphenyls containing a catalytic quantity of copper. The reaction mixture is held at reaction temperature for a further 1½–2 hours to give a total time at reaction temperature of about 7 hours. Unreacted phthalic anhydride is recovered by sublimation under reduced pressure. The molar ratios of reactants, and various features of the products, are set out in Table I below.

TABLE I.—PROPERTIES OF SOME CARBOXYLIC CONTAINING POLYPHENYLENE POLYMERS

| Reactants | | | Product | | | | |
|---|---|---|---|---|---|---|---|
| Molar Ratios | | | E.W.[4] | Percent P.A.[3] by weight | M.W.[5] | Analysis | |
| T[1] | B.D.S.[2] | P.A.[3] | | | | C[6] | H[7] |
| 0.61 | 1.0 | 2.48 | 209 | 35.4 | 835 | 84.0 | 4.0 |
| 0.5 | 1.0 | 2.42 | 179 | 41.3 | 927 | 81.5 | 3.8 |
| 0.5 | 1.0 | 1.5 | 166 | 44.6 | | 81.1 | 3.9 |
| 0.4 | 1.0 | 2.4 | 169 | 43.8 | | 81.1 | 3.4 |

[1] Terphenyls.
[2] Benzene-m-disulphonyl chloride.
[3] Phthalic anhydride.
[4] Equivalent weight.
[5] Molecular weight.
[6] Percentage by weight of carbon.
[7] Percentage by weight of hydrogen.

EXAMPLE 4

Example 1 is repeated here except that 3,3′,4,4′-benzophenone tetracarboxylic dianhydride is used in place of the phthalic anhydride used in Example 1. Comparable results are obtained.

EXAMPLE 5

Example 1 is repeated here except that monochlorophthalic anhydride is used in place of the phthalic anhydride used in Example 1. Comparable results are obtained.

EXAMPLE 6

Example 1 is repeated here except that 3,3′,3,3′-biphenyl tetracarboxylic dianhydride is used in place of the phthalic anhydride used in Example 1. Comparable results are obtained.

EXAMPLE 7

Example 1 is repeated here except that diphenyl sulphone 3,3′,4,4′-tetracarboxylic dianhydride is used in place of the phthalic anhydride used in Example 1. Comparable results are obtained.

EXAMPLE 8

Example 1 is repeated here except that pyromellitic dianhydride is used in place of the phthalic anhydride used in Example 1. Comparable results are obtained.

EXAMPLE 9

The following example is set forth to show the use of a cross-linking agent used in conjunction with a carboxylic containing polyphenylene polymer of the present invention in order to prepare a cross-linked heat resistant composite. To a 10% chloroform solution of the resin prepared in Example 1 is added 5% by weight, based on the weight of the resin solids, of para-amino phenol.

The mixture is dissolved (substantially completely) in the chloroform, and the solution is used to impregnate an asbestos felt mat measuring 16 inches by 12 inches. The solvent is allowed to evaporate, and then six pieces, each 4 inches by 2 inches, are cut from the mat and placed one on top of another. The assembly was transferred to a press at 234° C. and after a warm-up period of 3.5 minutes, a pressure of 500 pounds per square inch (gauge) is applied. These conditions are maintained for 2 hours, and the laminate is then post-cured in air at 240° C. for 2 days.

The resultant laminate exhibits good physical properties.

In general, the carboxylic containing polyphenylene polymers of the present invention may be cross-linked using those methods which are well known to those skilled in the art. Examples of cross-linking agents suitable for use with the carboxylic containing polyphenylene polymers of the present invention include glycols and glycol derivatives such as glycol diacetate; amino alcohols; amino phenols and phenol derivatives such as dihydroxy naphthalene, bis-phenols, etc.; mercaptans; mercapto alcohols; mercapto amines; etc.

The resins of the present invention find great utility wherever high temperature resistant resins are required as for example in high temperature laminates, composites and protective coating.

The resins of the present invention may be reinforced with fibrous or particulate reinforcing materials which are well known to those skilled in the art. Examples of these reinforcing elements include glass fibers, asbestos fibers, refracil, boron fibers, quartz fibers, etc. Examples of particulate reinforcing agents would include metallic and semi-metallic particles, micro-balloons, etc.

As will be apparent to those skilled in the art, the resins of the present invention may be modified by the use of materials such as titanium oxide, clays, silica gel, pigments, etc.

From the foregoing it should be apparent that many modifications may be made in the present invention without departing from the spirit and scope thereof.

What is claimed is:

1. An aromatic polyanhydride which is the condensation reaction product of (a) an aromatic polysulphonyl halide containing at least two sulphonyl halides each linked to a nuclear carbon atom, (b) an aromatic intramolecular carboxylic anhydride having replaceable nuclear hydrogen atoms, and (c) a third aromatic compound having replaceable nuclear hydrogen atoms wherein the anhydride has a least two replaceable nuclear hydrogen atoms and is inert with respect to the sulphonyl halide, and wherein the third aromatic compound has at least two replaceable nuclear hydrogen atoms and is inert with respect to the sulphonyl halide and is inert with respect to the anhydride.

2. An aromatic polyanhydride according to claim 1 wherein the respective reactants are (a) benzenedisulphonyl chloride; (b) phthalic anhydride and (c) terphenyl.

3. An aromatic polyanhydride according to claim 1 wherein the anhydride is present in amounts of 0.5 to 2.5 mols of the anhydride per equivalent of the sulphonyl halide and the molar ratio of the third aromatic compound to the aromatic polysulphonyl halide is not greater than the number of sulphonyl halide groups in the aromatic polysulphonyl halide.

4. An aromatic polyanhydride according to claim 1 wherein the aromatic moiety of the aromatic polysulphonyl halide is selected from the group consisting of substituted and unsubstituted benzene, naphthalene, biphenyl ether, diphenyl ether, aromatic compounds containing from two to four benzene nuclei arranged in a sequence wherein the successive nuclei are linked directly and aromatic compounds containing from four to four benzene nuclei arranged in a sequence wherein the successive nuclei are linked through a divalent radical selected from the group consisting of oxygen, sulphur, sulphonyl, phosphonyl and silicon; wherein the substituents are seletced from the group consisting of alkyl groups and halogens.

5. An aromatic polyanhydride according to claim 1 wherein the aromatic intramolecular carboxylic anhydride has a molecular structure comprising at least one aromatic nuclei selected from the group consisting of unsubstituted and halogen substituted benzene and naphthalene nuclei in which adjacent nuclei in an anhydride containing more than one nucleus are linked directly, and wherein only one anhydride grouping is associated with any one nucleus.

6. An aromatic polyanhydride according to claim 1 wherein the aromatic intramolecular carboxylic anhydride has a molecular structure comprising at least one aromatic nuclei seletced from the group consisting of unsubstituted and halogen substituted benzene and naphthalene nuclei in which adjacent nuclei in an anhydride containing more than one nucleus are linked through a bilvalet radical selected from the group consisting of oxygen, sulphur, sulphonyl, carbonyl, phosphonyl and silicon.

7. An aromatic polyanhydride according to claim 1 wherein the anhydride is selected from the group consisting of phthalic anhydride, monochlorophthalic anhydride, phenylphthalic anhydride, naphthalic anhydride,-3,3',4,4'-biphenyl tetracarboxylic dianhydride, benzophenone-3,3', 4,4'-tetracarboxylic dianhydride and diphenyl sulphone-3,3',4,4'-tetracarboxylic dianhydride.

8. An aromatic polyanhydride according to claim 1 wherein the third aromatic compound is selected from the group consisting of unsubstituted and halogen substituted naphthalene, dibenzothiophen, dibenzofuran nucleus and aromatic compound having sequence of at least two aromatic nuclei selected from the group consisting of benzene, naphthalene, dibenzofuran, dibenzothiophen nuclei; wherein adjacent nuclei in the sequence are linked directly.

9. An aromatic polyanhydride according to claim 1 wherein the third aromatic compound is selected from the group consisting of unsubstituted and halogen substituted naphthalene, dibenzothiophen, dibenzofuran nucleus and aromatic compound having a sequence of at least two aromatic nuclei selected from the group consisting of benzene, naphthalene, dibenzofuran, dibenzothiophen nuclei; wherein adjacent nuclei in the sequence are linked through a bivalent radical selected from the group consisting of oxygen, sulphur, sulphonyl, carbonyl, phosphonyl and silicon.

10. An aromatic polyanhydride according to claim 1 wherein the third aromatic compound is a silicon-containing compound have a molecular structure comprising more than one aromatic nucleus selected from the group consisting of benzene and naphthalene nuclei, each nucleus being bonded to a silicon atom or to another nucleus either directly or through an oxygen atom and each silicon atom being bonded either directly to an aromatic nucleus or through an oxygen atom to an aromatic nucleus or to another silicon atom, and which is either free from additional nuclear substituents or contains one or more nuclear halogen atoms.

11. A cross-liked aromatic polyanhydride which is the reaction product of (A) an aromatic polyanhydride which is the condensation reaction product of (a) an aromatic polysulphonyl halide containing at least two sulphonyl halides each linked to a nuclear carbon atom, (b) an aromatic intramolecular carboxylic anhydride having replaceable nuclear hydrogen atoms, and (c) a third aromatic compound having replaceable nuclear hydrogen atoms where the anhydride has at least two replaceable nuclear hydrogen atoms and is inert with respect to the sulphonyl halide, and wherein the third aromatic compound has at least two replaceable nuclear hydrogen atoms and is inert with respect to the sulphonyl halide and is inert with respect to the anhydride; and (B) a crosslinking agent selected from the group consisting of glycols, amino alcohols, phenols, amino phenols, mercaptans, mercapto alcohols and mercapto amines.

12. Fibrous reinforcing agents impregnated with an aromatic polyanhydride which is the condensation reaction product of (a) an aromatic polysulphonyl halide containing at least two sulphonyl halides each linked to a nuclear carbon atom, (b) an aromatic intramolecular carboxylic anhydride having replaceable nuclear hydrogen atoms, and (c) a third aromatic compound having replaceable nuclear hydrogen atoms wherein the anhydride has at least two replaceable nuclear hydrogen atoms and is inert with respect to the sulphonyl halide, and wherein the third aromatic compound has at least two replaceable nuclear hydrogen atoms and is inert with respect to the sulphonyl halide and is inert with respect to the anhydride.

References Cited
FOREIGN PATENTS 1,037,111   7/1966   Great Britain.

JOSEPH L. SCHOFER, *Primary Examiner.*

C. A. HENDERSON, JR., *Assistant Examiner.*

U.S. Cl. X.R.

260—37, 2; 117—161, 126; 161—205, 170